United States Patent [19]

Becker

[11] 4,026,408
[45] May 31, 1977

[54] CHIP CONVEYOR

[75] Inventor: Roger T. Becker, Kalamazoo, Mich.

[73] Assignee: Kalamazoo Conveyor Company, Kalamazoo, Mich.

[22] Filed: Feb. 9, 1976

[21] Appl. No.: 656,817

[52] U.S. Cl. .................. 198/741; 198/747
[51] Int. Cl.² ........................... B65G 25/08
[58] Field of Search ........... 198/221, 224, 227, 24, 198/741, 747

[56] References Cited

UNITED STATES PATENTS

| 2,559,541 | 7/1951 | Martin | 198/224 |
|---|---|---|---|
| 2,964,160 | 12/1960 | Powers | 198/221 |
| 3,656,609 | 4/1972 | Okano et al. | 198/224 |
| 3,777,880 | 12/1973 | Becker et al. | 198/221 |
| 3,828,920 | 8/1974 | Becker et al. | 198/221 |

Primary Examiner—Evon C. Blunk
Assistant Examiner—Joseph E. Valenza
Attorney, Agent, or Firm—Woodhams, Blanchard and Flynn

[57] ABSTRACT

An elongated conveyor for effecting unidirectional movement of materials lengthwise thereof, said conveyor having an upwardly opening trough and structure therein for advancing the materials unidirectionally, which advancing structure is reciprocable below the lower wall of the trough for movement lengthwise of the trough. A slot is disposed in the lower wall adjacent the track, and a connector extends from the carriage to the advancing structure. A pressure fluid operated actuator is mounted on the lower wall in alignment with the track for effecting reciprocal movement of the carriage, whereby the material advancing structure is reciprocated within the trough.

4 Claims, 10 Drawing Figures

CHIP CONVEYOR

BACKGROUND OF THE INVENTION

This invention relates in general to chip conveyors and, more particularly, to a type thereof having an upwardly opening trough and material advancing means disposed in the lower portion of the trough and supported for reciprocating movement lengthwise of the trough. Barbs, plows or the like, are associated with the material advancing means for effecting unidirectional movement of the materials. A plurality of elements are secured to and extend inwardly from the walls of the trough for assisting in effecting said unidirectional movement of the materials. An example of this type of conveyor is disclosed in U.S. Pat. No. 3,829,920 entitled "Harpoon Conveyor" and issued on Aug. 15, 1974.

Chip conveyors of the type disclosed in the above-mentioned patent have proven particularly advantageous in the removal of metal chips and turnings produced by metal working machinery, such as lathes, boring mills and drilling machines. However, it has heretofore been necessary to position the actuating means, which reciprocates the material advancing means, at one end and outside of the trough. Thus, where floor space is at a premium, it is sometimes impractical, if not impossible, to use existing types of chip conveyors which utilize a reciprocating action for effecting the unidirectional movement of the materials.

It was previously thought that it would not be feasible to connect the actuating means to the chip advancing mechanism between the ends of the trough because the connecting means would either interfere with the movement of the materials or would provide an escape for the materials from the trough and thereby defeat the purpose of the equipment.

Accordingly, a primary object of this invention is the provision of a trough-type conveyor for effecting unidirectional movement of materials therealong wherein the drive means for effecting the advancement of the materials along the trough can be disposed completely between the ends of the trough which, therefore, permits maximum utility of the conveyor in the space available.

A further object of the invention is the provision of a conveyor, as aforesaid, in which the actuation of the material advancing means can be effected without permitting the escape of materials from the trough.

Other objects and purposes of this invention will become apparent to persons familiar with this type of equipment upon reading the following specification and examining the accompanying drawings.

SUMMARY OF THE INVENTION

The objects and purposes of the invention, including those set forth above, have been met by providing a conveyor, commonly referred to as a harpoon conveyor, comprised of an elongated upwardly opening trough which is normally in the horizontal or substantially horizontal position and has a lower wall with a lengthwise slot therein. Guide means are provided within the trough on the lower wall for supporting material advancing means for reciprocable movement lengthwise of the trough. Track supported carriage means is disposed beneath the trough adjacent to the slot therein for lengthwise movement thereof. A pressure fluid actuator is secured to the trough and connected to the carriage means for effecting reciprocal movement thereof along the track. A connector between the carriage means and the material advancing means translates reciprocal movement of said carriage means into reciprocal movement of said advancing means.

DETAILED DESCRIPTION

Figure 1:
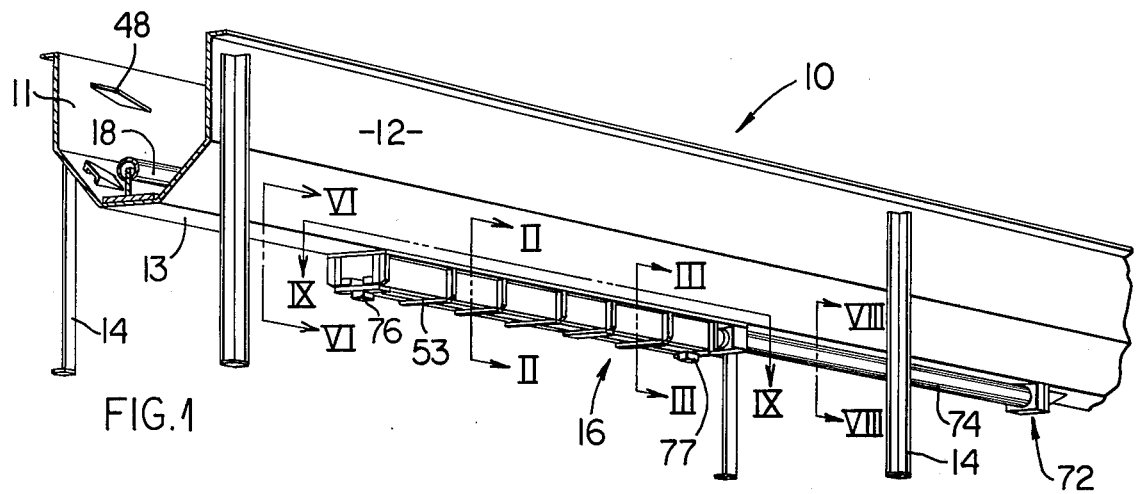
FIG. 1 is a perspective view of a fragment of a conveyor embodying the invention.

A preferred embodiment of the invention, which is illustrated in FIG. 1, comprises an elongated upwardly opening trough 10 which has upright side walls 11 and 12 and a lower wall 13. In this particular embodiment, the trough is supported upon floor means, not shown, by legs 14. However, the trough can be disposed within a pit in the floor, as illustrated in said U.S. Pat. No. 3,828,920, so that the upper edges of the side walls 11 and 12 are substantially flush with the floor. In such case, appropriate provision can be made for receiving the drive means 16 secured to the outer surface of the lower wall 13.

Figure 6:
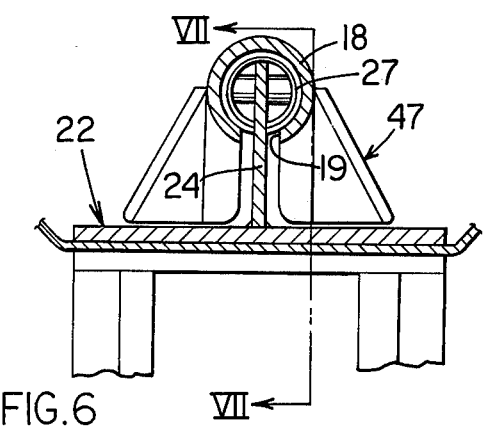
FIG. 6 is a sectional view taken along the line VI—VI in FIG. 1.
Figure 7:
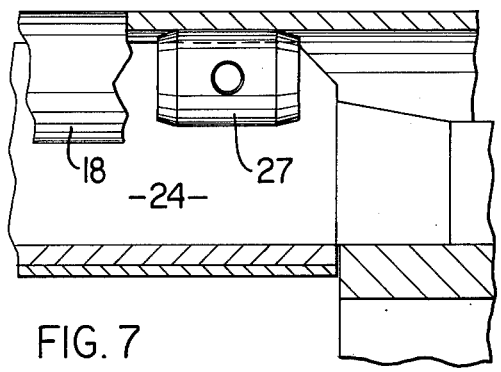
FIG. 7 is a sectional view taken along the line VII—VII in FIG. 6.
Figure 8:
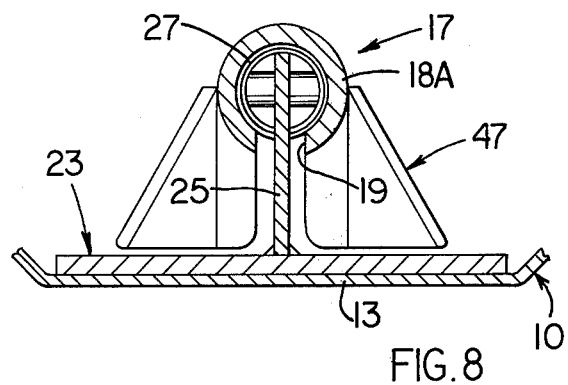
FIG. 8 is a sectional view taken along the line VIII—VIII in FIG. 1.
Figure 9:
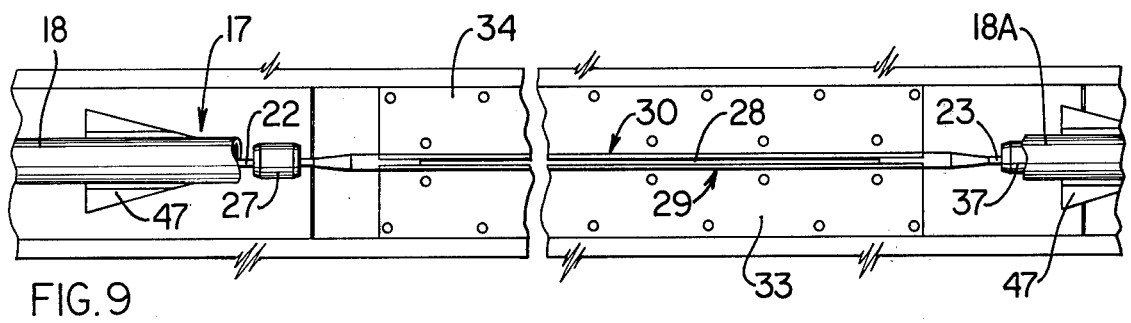
FIG. 9 is a sectional view taken along the line IX—IX in FIG. 1.

The trough 10 is provided with a reciprocating plow assembly 17 (FIGS. 8 and 9) for advancing the materials along the trough which, generally speaking, may be similar to the plow assembly disclosed in said U.S. Pat. No. 3,828,920. More specifically, said assembly 17 is comprised of an elongated cylinder 18 having a slot 19 extending lengthwise thereof along the lower side thereof. A pair of spaced, elongated, aligned and T-shaped rails 22 and 23, FIGS. 6 and 8, respectively, are secured to the inner surface of the lower wall 13 s that their stems 24 and 25, respectively, project upwardly through the slot 19 of the cylinder 18. A plurality of sleeve bearings 27, FIGS. 6 and 7, are secured to the upper edges of the stems 24 and 25 for slidable engagement with the interior surface of the cylinder 18. The lower wall 13, FIG. 9, of the trough 10 is provided with an elongated slot which is preferably aligned with the stems 24 and 25 and extend substantially between the adjacent ends thereof.

A pair of elongated angles 29 and 30 (FIG. 9) having parallel flanges 33 and 34, respectively, are secured to the inner surface of the lower wall 13 on opposite sides of and parallel with the slot 28. Said angles 29 and 30 have vertical parallel and spaced flanges 36 and 37 (FIGS. 2 and 3), respectively, whose upper edges project into the cylinder 18 through the slot 19. Thus, said angles 29 and 30 cooperate with the cylinder 18 to positively prevent movement of materials in the trough downwardly through the slot 28 in the lower wall 13.

Figure 3:
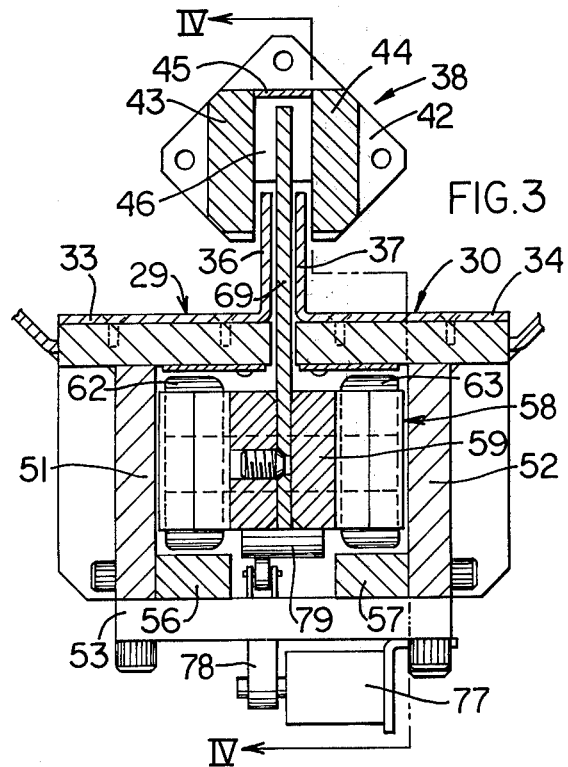
FIG. 3 is a sectional view taken along the line III—III in FIG. 1.
Figure 4:
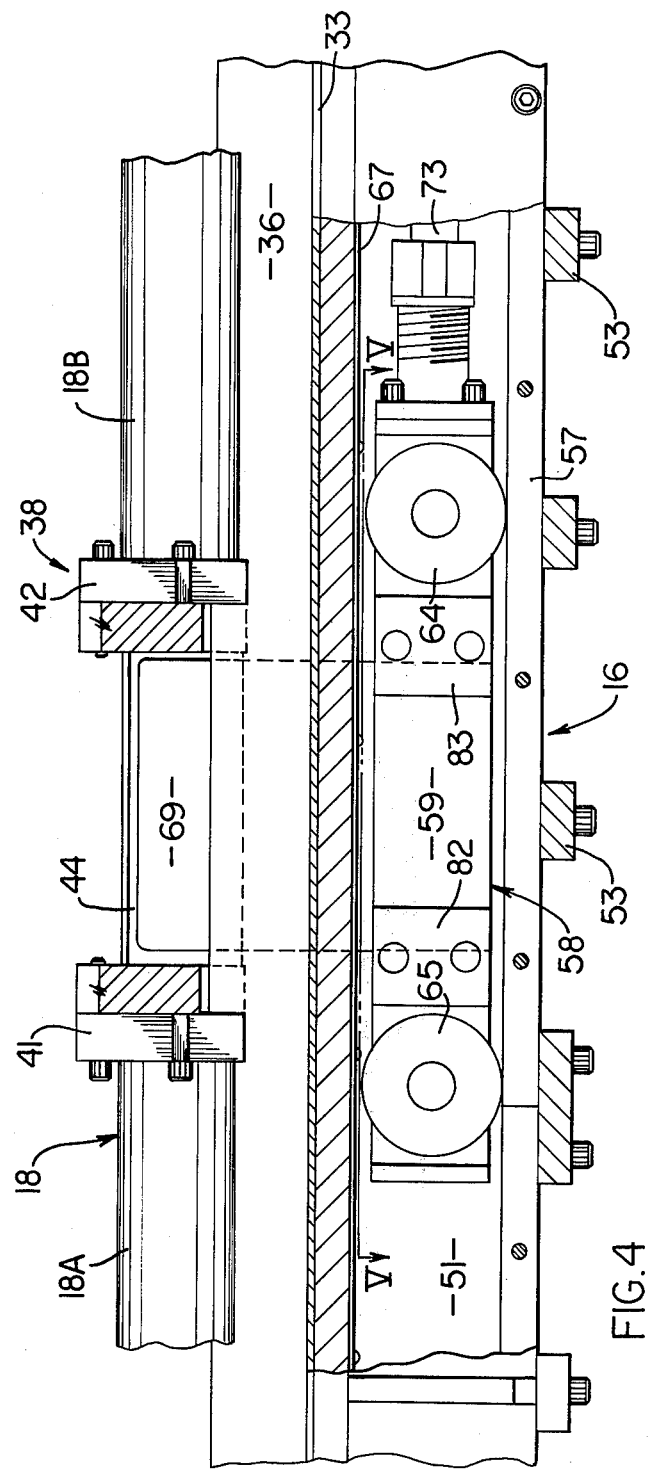
FIG. 4 is a sectional view taken along the line IV—IV in FIG. 3.

The cylinder 18 includes two aligned portions 18A and 18B having spaced adjacent ends coupled together by a connecting receiver 38, FIGS. 3 and 4, which receiver 38 is comprised of a pair of flanges 41 and 42 connected to the adjacent ends of the cylinder portions 18A and 18B, respectively. A pair of spaced bar 43 and 44 are rigidly secured to and extend between the flanges 41 and 42, whereby there is formed an elongated slot 46 between the bars 43 and 44. The upper end of slot 46 is closed by plate 45.

A plurality of plows or blades 47, (FIGS. 6 and 9) are secured to the cylinder portions 18A and 18B and extend downwardly therefrom toward the lower wall 13. Said plows have side walls and a bottom wall which preferably converge away from the direction in which the materials are advanced thereby when the cylinder 18 is reciprocated by means described hereinafter.

Various types of inwardly extending blades or obstructions 48 (FIG. 1) are mounted upon the interior surfaces of the trough 10 for the purpose of enhancing the unidirectional movement of the materials along the trough.

The plow assembly 17, which is reciprocated along the guide rail structure formed by the bushings 27, is driven by the drive assembly 16. The assembly 16 is comprised of a pair of spaced parallel, elongated and substantially vertical side plates 51 and 52 which are rigidly secured to, extend lengthwise of and project downwardly from the lower wall 13. The side plates 51 and 52 are interconnected by cross bars 53 which are rigidly secured to the lower edges of said side plates at spaced intervals therealong. A pair of spaced parallel and elongated tracks 56 and 57 are secured to the opposing surfaces of the side plates 51 and 52, respectively, adjacent their lower edges.

Figure 5:
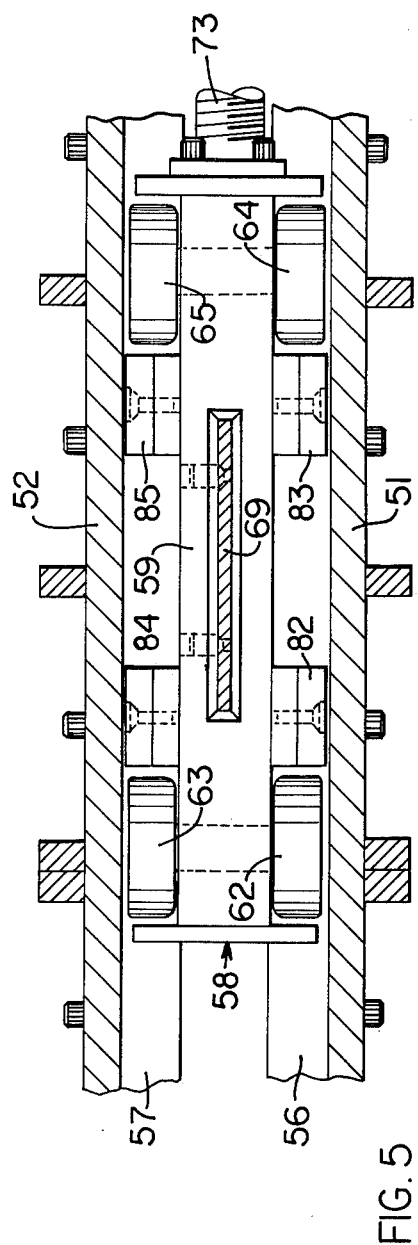
FIG. 5 is a sectional view taken along the line V—V in FIG. 4.

A carriage 58 is movably supported on tracks 56 and 57, which carriage is comprised of an elongated central beam 59 having two pairs of wheels 62, 63 and 64, 65 (FIG. 5) rotatably mounted upon the leftward and rightward ends, respectively, of the beam 59. The peripheries of said wheels extend above and below the beam 59 so that they are engageable with the tracks 56 and 57. A pair of wear plates 67 and 68 (FIG. 2) are secured to the under surface of the lower wall 13 on opposite sides of the slot 28 and lengthwise thereof for engagement by said wheels under certain conditions of operation of the conveyor.

A platelike connector 69 is rigidly secured to the beam 59 and projects vertically therefrom through the slot 28 and upwardly between and above the vertical flanges 36 and 37 of the angles 29 and 30 (FIG. 3). The upper edge of the connector 69 also extends into the slot 46 so as to be disposed between the bars 43 and 44 and the flanges 41 and 42. Accordingly, movement of the carriage 58 lengthwise of the trough 10 is translated by the connector 69 into movement of the plow assembly 17 lengthwise of the trough 10.

The drive assembly 16 (FIG. 1) also includes a pressure fluid operator 72, such as a hydraulic cylinder 74, having a piston rod 73 (FIG. 4) secured to the rightward end of the carriage 58. the cylinder 74 is rigidly secured to the lower surface of the lower wall 13 and is preferably aligned with the slot 28 therein.

Figure 2:
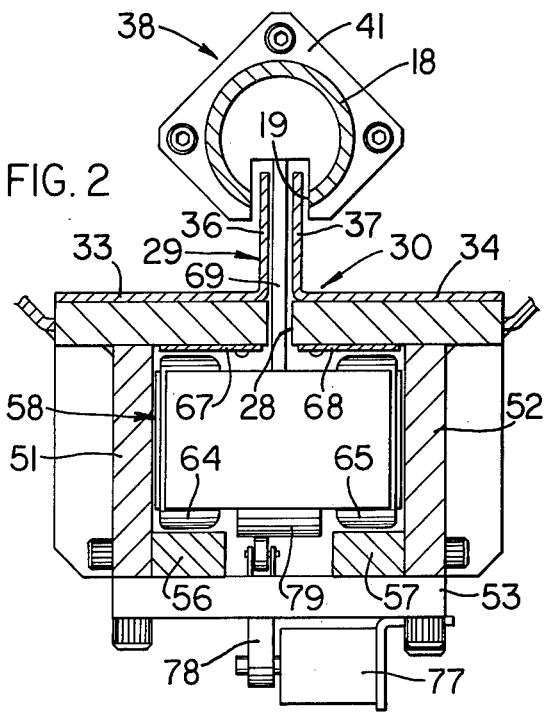
FIG. 2 is a sectional view taken along the line II—II in FIG. 1.

A pair of microswitches 76 and 77 (FIG. 1) are secured to the side plate 52 near the opposite ends thereof in a manner illustrated with respect to the switch 77 in FIGS. 2 and 3. The switch 77, for example, had a switch arm 78 which is operated by the bar 79 as the carriage 58 approaches the rightward end of the tracks 56 and 57 (FIG. 1). The switch 76 is similarly disposed at the opposite or leftward end of the tracks 56 and 57 for the purpose of operation by said bar 79 when the carriage 58 reaches said leftward end of the tracks. The switches 76 and 77 are connected in a conventional manner to means for controlling the flow of pressure fluid into and out of the power cylinder 74 whereby the piston rod 73 is extended and then retracted in a conventional manner.

Figure 10:
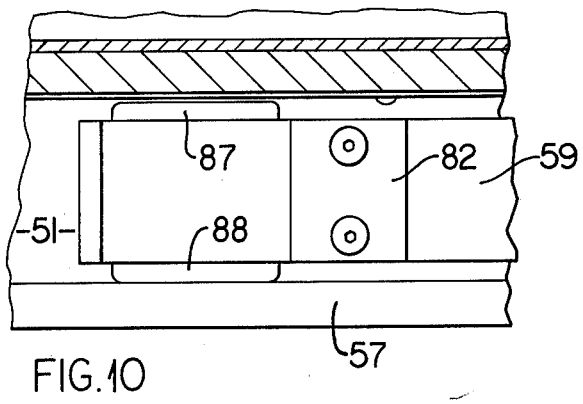
FIG. 10 is a sectional view taken along the line IV—IV in FIG. 3 and illustrating a modified structure.

A pair of bumper guides 82, 83 and 84, 85 are mounted upon opposite sides of the carriage beam 59 inboard of the wheels 62, 63 and 64, 65 for sliding engagement with the side walls 51 and 52, respectively, in order to prevent jamming of said wheels against said side plates In an alternate construction (FIG. 10) the wheels 62, 63 and 64, 65 are replaced by pairs of upper and lower side guides 87 and 88, respectively, located at and mounted upon the opposite lengthwise ends of the beam 59. Said slide guides are engageable with the track 57 and 56 (FIG. 2) or the wear plates 67 and 68.

OPERATION

While the manner in which said conveyor operates is apparent from the foregoing description, a brief summary thereof is set forth hereinafter.

The power cylinder 74 of the actuator 72 is operated in a conventional manner whereby the piston rod 73 is extended from and retracted into the power cylinder 74 in a periodic manner which can be controlled as desired. This movement of the piston rod 73 effects a corresponding movement of the carriage 58, which movement is translated by the connector 69 into lengthwise reciprocating movement of the plow assembly 17, whereby the materials (chips, etc.) are moved unidirectionally (leftwardly in FIG. 9) in an intermittent steplike manner along the trough. Depending upon the force required to move the material along the trough 10, and the length of the piston rod 73, said piston rod may be deflected either upwardly or downwardly during the extension and retraction thereof. Thus, depending upon the circumstances, the wheels 62, 63 and 64, 65 or the slide guides 87 and 88 may be engaged with the tracks 56, 57 or the wear plates 67, 68 during the operation of the conveyor. In this embodiment, the reciprocation of the piston rod 73 is automatically controlled by the microswitches 76, 77, and adjustable control thereof is contemplated.

Although a particular preferred embodiment of the invention has been disclosed in detail for illustrative purposes, it will be recognized that variations or modifications of the disclosed apparatus, including the rearrangement or parts, lie within the scope of the present invention.

The embodiments of the invention in which an exclusive property or privilege is claimed are defined as follows:

1. In a harpoon-type conveyor having an elongated upwardly-opening channel-shaped trough defined by a bottom wall and upwardly projecting sidewalls, elongated guide rail means fixedly positioned within said trough and extending lengthwise thereof, said guide rail means being fixed to and projecting upwardly from said bottom wall, an elongated harpoon-type material advancing assembly slidably supported on said guide means for unidirectionally moving material along said trough, and drive means interconnected to said material advancing assembly for reciprocating same within said trough, the improvement comprising:

said drive means being disposed in its entirety between the ends of said material advancing assembly and drivingly interconnected to an intermediate portion thereof, said drive means including motor means positioned adjacent the bottom wall but disposed externally of said trough;

narrow elongated slot means formed in and through the bottom wall of said trough intermediate the ends thereof, said elongated sot means being substantially aligned with said guide means;

elongated track means extending substantially coextensively of said slot means and being fixed to and spaced downwardly from said bottom wall;

said intermediate portion of said material advancing assembly defining a downwardly opening slot which is elongated in the direction of said assembly and is positioned substantially over said slot means as formed in said bottom wall;

shield means fixed to said bottom wall and projecting upwardly therefrom on opposite sides of said slot means for preventing the material being conveyed along said trough from passing through said slot means, said shield means including a pair of shield members fixed to said bottom wall and projecting upwardly therefrom on opposite sides of said slot means, said shield members defining a narrow space therebetween and having the upper edges thereof projecting into the downwardly opening slot formed in said intermediate portion, said intermediate portion having opposed spaced-apart sidewalls which project downwardly a sufficient distance to overlap and confine therebetween the upper edges of said shield members;

said drive means also including connecting means interconnected between said motor means and said intermediate portion of said material advancing assembly, said connecting means including a reciprocating carriage movably supported on said track means solely for rectilinear reciprocating movement in the lengthwise direction thereof;

said connecting means also including a connecting member rigidly fixed to said carriage means and projecting upwardly therefrom through said slot means into the interior of the slot formed in said intermediate portion of said assembly, said connecting member being separable from said intermediate portion, and said intermediate portion having end walls defining the opposite extremities of said slot for confining said connecting member therebetween, whereby reciprocating movement of said carriage and of the connecting member carried thereby causes a corresponding reciprocating movement of said assembly.

2. A conveyor according to claim 1, wherein said connecting member comprises a platelike member fixed to said carriage and projecting upwardly through said slot means into said slot, said platelike member having opposite end edges which are positioned closely adjacent the end walls of said intermediate portion, said end edges being adapted to abuttingly engage said end walls for causing said material advancing assembly to be drivingly reciprocated in response to reciprocating movement of said carriage means by said motor means.

3. A conveyor according to claim 2, wherein said track means defines a pair of spaced-apart upwardly directed support surfaces, said carriage means having two pairs of rollers mounted thereon and disposed in rolling engagement with said support surfaces, and wear plate means fixed to the exterior surface of said bottom wall and positioned directly above and substantially parallel with said support surfaces, said wear plate means and said support surfaces being spaced apart by a distance slightly greater than the diameter of said rollers for closely confining said rollers therebetween.

4. A conveyor according to claim 2, wherein the driving connection between said carriage and said intermediate portion is achieved solely by the abutting engagement between the end edges of said platelike member and the end walls of said intermediate portion, and said guide means as it extends lengthwise of said trough being interrupted in the region of said slot means.

* * * * *